United States Patent
Coskun

(10) Patent No.: US 10,708,288 B2
(45) Date of Patent: Jul. 7, 2020

(54) COMPUTERIZED SYSTEM AND METHOD FOR AUTOMATICALLY DETERMINING MALICIOUS IP CLUSTERS USING NETWORK ACTIVITY DATA

(71) Applicant: OATH INC., New York, NY (US)

(72) Inventor: Baris Coskun, Glen Rock, NJ (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/253,489

(22) Filed: Jan. 22, 2019

(65) Prior Publication Data
US 2019/0158526 A1 May 23, 2019

Related U.S. Application Data

(63) Continuation of application No. 15/281,880, filed on Sep. 30, 2016, now Pat. No. 10,193,915.

(51) Int. Cl.
*H04L 29/06* (2006.01)
*H04W 12/08* (2009.01)

(52) U.S. Cl.
CPC ...... *H04L 63/1425* (2013.01); *H04L 63/1441* (2013.01); *H04L 63/0236* (2013.01); *H04W 12/08* (2013.01)

(58) Field of Classification Search
CPC . H04L 29/06; H04L 63/1425; H04L 63/1441; H04L 63/0236; H04W 12/08
USPC .......................................................... 726/23
See application file for complete search history.

(56) References Cited

U.S. PATENT DOCUMENTS

| | | | |
|---|---|---|---|
| 9,710,646 B1 | 7/2017 | Zhang et al. | |
| 9,749,336 B1* | 8/2017 | Zhang | H04L 63/14 |
| 10,193,915 B2* | 1/2019 | Coskun | H04L 63/1425 |
| 2006/0233171 A1* | 10/2006 | Murray | H04L 12/185 370/390 |
| 2006/0288415 A1* | 12/2006 | Wong | H04L 63/1425 726/24 |
| 2009/0113016 A1 | 4/2009 | Sen et al. | |
| 2009/0138590 A1* | 5/2009 | Lee | H04L 43/045 709/224 |
| 2010/0122335 A1* | 5/2010 | Van der Merwe | G06F 21/55 726/11 |
| 2011/0179164 A1 | 7/2011 | Memon et al. | |

(Continued)

*Primary Examiner* — Abu S Sholeman
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide a novel clustering framework applied on datasets of network interactions to automatically identify IP clusters carrying out a specific task(s) based on an IP blacklist. The disclosed systems and methods can analyze network activity of devices associated with the IP addresses, and/or the IP addresses themselves, and perform an automatic, on-the-spot analysis that results in a determination whether the activity is permitted on or over a network.

20 Claims, 8 Drawing Sheets

(56) References Cited

U.S. PATENT DOCUMENTS

| | | | |
|---|---|---|---|
| 2012/0084860 A1* | 4/2012 | Cao | H04L 63/1441 |
| | | | 726/23 |
| 2012/0233694 A1 | 9/2012 | Baliga et al. | |
| 2014/0250221 A1 | 9/2014 | Boggs et al. | |
| 2015/0163235 A1 | 6/2015 | Coskun et al. | |
| 2015/0169794 A1* | 6/2015 | Maennel | H04W 4/029 |
| | | | 703/2 |
| 2016/0021141 A1 | 1/2016 | Liu et al. | |
| 2016/0226819 A1 | 8/2016 | Manadhatta et al. | |
| 2016/0330236 A1* | 11/2016 | Reddy | H04L 63/1466 |
| 2016/0381183 A1 | 12/2016 | Jusko et al. | |
| 2018/0048620 A1 | 2/2018 | Inoue et al. | |
| 2018/0077179 A1* | 3/2018 | Zhang | H04L 63/1441 |

* cited by examiner

COMPUTERIZED SYSTEM AND METHOD FOR AUTOMATICALLY DETERMINING MALICIOUS IP CLUSTERS USING NETWORK ACTIVITY DATA

CROSS-REFERENCE TO RELATED APPLICATIONS

This application claims the benefit of and is a continuation of U.S. patent Ser. No. 15/281,880, filed on Sep. 30, 2016, titled "Computerized System And Method For Automatically Determining Malicious IP Clusters Using Network Activity Data", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer systems and/or platforms by modifying the capabilities and providing non-native functionality to such systems and/or platforms for a novel and improved framework for automatically determining malicious IP clusters using an IP blacklist when analyzing network activity data.

SUMMARY

Most of the complex tasks on the Internet—both malicious and benign—are collectively carried out by devices associated with clusters of Internet Protocol (IP) addresses. The disclosed systems and methods provide computerized mechanisms and frameworks for discovering such IP clusters by processing datasets and logs collected at various vantage points (or nodes) on the network. It is generally understood by those of skill in the art that not all clusters of IP addresses are malicious. With this understanding, the present disclosure provides novel, computerized systems and methods for accurately distinguishing malicious clusters of IP addresses from benign ones through implementation of an IP blacklist, which can be dynamically updated to accurately portray the network actors and their determined types of activity on the network. As discussed herein, usage of the IP blacklist can enable the computing device(s) and/or network platform performing such analysis to perform such tasks without requiring any complex analysis to verify malicious behavior. As evidenced by the discussion herein, this can alleviate the strain on a network or computer hosting a network in transmitting, communicating and/or analyzing network data, as the computational power can be routed from the detection steps of determining whether activity is malicious, to the steps of actually facilitating and/or preventing the network activity.

According to some embodiments, the disclosed systems and methods provide a novel clustering framework which can be applied on datasets of network interactions to automatically identify IP clusters carrying out a specific task, or a collective grouping of tasks. Then, given such a list of identified clusters of IP addresses, the disclosed systems and methods can detect, determine, derive or otherwise identify the IP addresses associated with malicious actors on the network using an IP blacklist. As discussed herein, by implementing the IP blacklist when clustering types of IP addresses (or activities performed by devices of IP addresses), the device, network and/or platform executing the disclosed systems and methods become blacklist-aware. This can significantly improve a network's overall ability to detect malicious clusters, while keeping network resources available for vital network activity.

Accordingly, in one or more embodiments, a method is disclosed for a novel and improved framework for automatically determining malicious IP clusters using an IP blacklist when analyzing network activity data. As discussed herein, according to some embodiments, methods are disclosed for analyzing network activity of devices associated with the IP addresses, and/or the IP addresses themselves, and performing an automatic, on-the-spot analysis that results in a determination whether the activity is permitted on or over a network.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically determining malicious IP clusters using network activity data.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
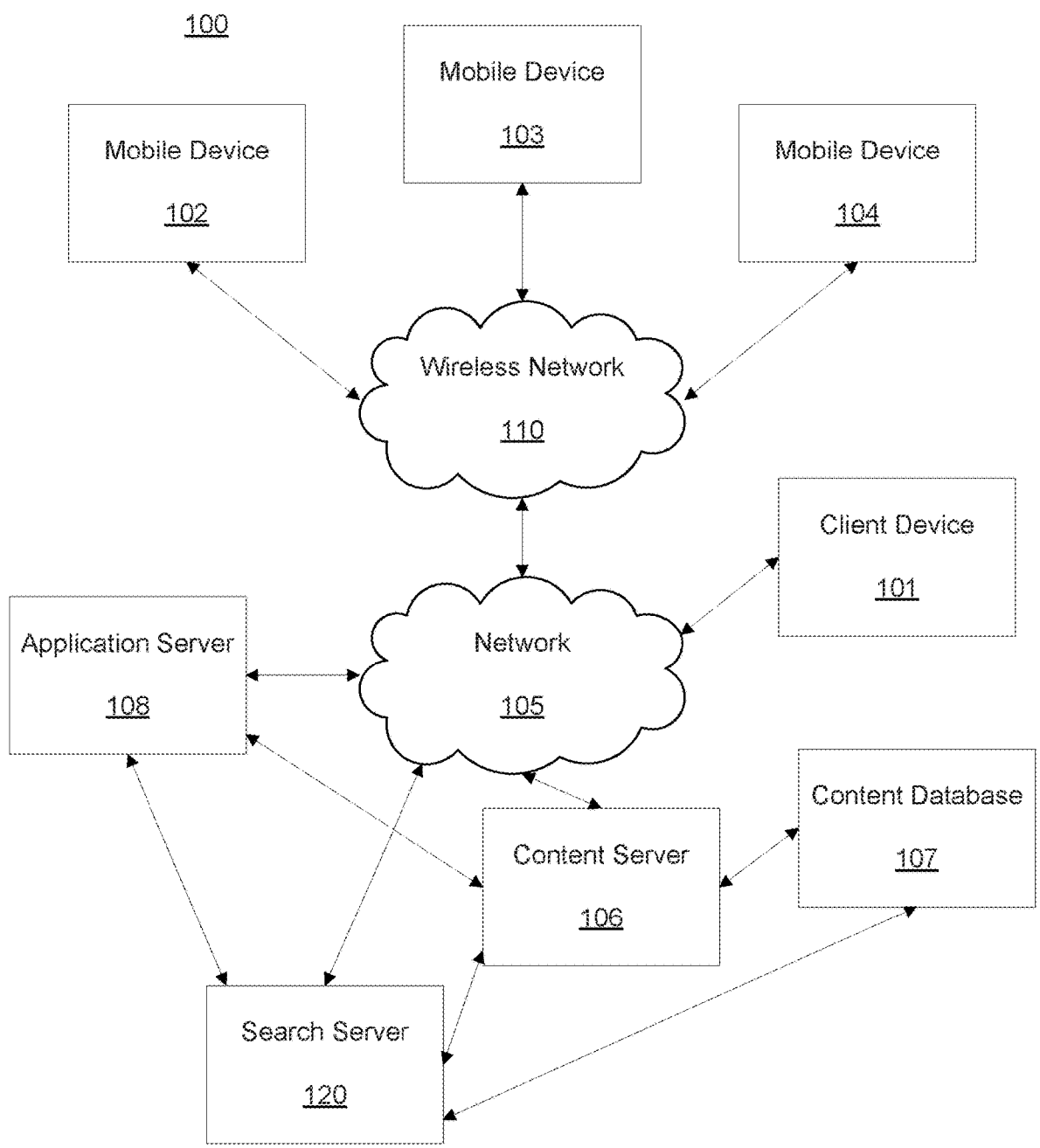
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

The principles described herein may be embodied in many different forms. By way of background, malicious activities on the Internet have evolved into complex operations which are carried out by groups of IP addresses. Email spam, distributed password guessing attacks and malware distribution networks are few examples of this sort. Such collective effort from a group of IP addresses often leaves noticeable traces at various vantage points in the network. This enables defenders to cluster the IP addresses of such groups together using simple data analysis techniques. For example, attackers often use a group of IP addresses to log into compromised web accounts to carry out various malicious tasks. Therefore, a clustering analysis of the login events, based on common accounts accessed from different IP addresses, allows an online service provider to link these IP addresses together, since they are used to log in to the same set of web accounts.

As understood by those of skill in the art, not all clusters of IP addresses produced by such data analysis schemes are malicious. For example, the same clustering analysis of login events mentioned above often groups together gateway or proxy IP addresses of various kinds of networks, such as a mobile network or a corporate network, since they are used by same sets of users to log into their accounts. Such clusters of gateway IP addresses are not malicious at all. In fact, there are numerous other legitimate cases that could result into benign IP clusters, such as content distribution networks, peer-to-peer networks and cloud computing services. As a result, most IP clusters discovered via conventional data analysis techniques are actually benign. To spot malicious clusters, further analysis to verify malicious behaviors and traits is often required. However, with conventional techniques, such kind of network behavioral analysis can often be quite complex and requires intense domain knowledge.

As discussed in herein, according to some embodiments of the instant disclosure, malicious clusters can be detected (or "spotted") by using an IP blacklist, and without requiring complex behavioral analyses. In some embodiments, even an incomplete IP blacklist, or an IP blacklist with an accuracy level below a threshold value can lead to proper detection of malicious activity or actors. The intuition is that, even if a blacklist frequently makes mistakes on individual IP addresses, it is highly unlikely that it makes mistakes on all IP addresses of a given cluster. Therefore, expected number of blacklisted IP addresses in a malicious cluster is statistically distinguishable from those in benign ones.

Based on this intuition, the disclosed systems and methods provide a novel, computationally simple scheme for identifying malicious clusters of IP addresses in a given dataset of network interactions, such as, for example, web account access logs or network flow records. As discussed in more detail below, the disclosed systems and methods involve first extracting clusters of IP addresses from a dataset using a blacklist-aware clustering algorithm, technique or scheme which maximizes the statistical dependence between resulting malicious clusters and a given IP blacklist. In some embodiments, as discussed in more detail below, this can involve comparing the cluster(s) of IP addresses to the IP blacklist, and determining the similarities via a compiled IP-IP graph (which represents the similarities between the IP addresses in the cluster(s) to the IP addresses in the IP blacklist), and then applying a graph clustering algorithm, technique or scheme, where the applied graph clustering technique utilizes a predetermined parameter associated with characteristics of the IP blacklist. Once a list of IP clusters is obtained, determined or otherwise identified based on such analysis, a determination is made regarding which IP clusters (and/or, in some embodiments, individual IP addresses in the clusters) are malicious. Such malicious determination can be based on which IP addresses/clusters are within the IP blacklist—or which are dependent upon the information within the blacklist, as discussed in more detail below.

As evidenced from the discussion herein, incorporation of an IP blacklist into both clustering and identification of malicious IP addresses improves the precision and recall ability of the computing device, network or platform performing the detection of malicious IP address clusters. Thus, the present disclosure provides a novel IP clustering framework for a given dataset of network interactions, which maximizes the statistical dependence between resulting malicious clusters and a given IP blacklist. As evidenced by the disclosure below, implementation of the disclosed systems and methods by a computing device, network or platform enables the identification of malicious clusters of IP addresses utilizing compromised user accounts (from an IP blacklist(s)), which results in a significantly more accurate result of malicious activity on a network than conventional baseline detection schemes, as mentioned above.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106, application (or "App") server 108 and search server 120.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a photo sharing site/service, an email platform or social networking site, a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), a mail or messaging application (e.g., Yahoo!® Mail, Yahoo! ® Messenger), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 120.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
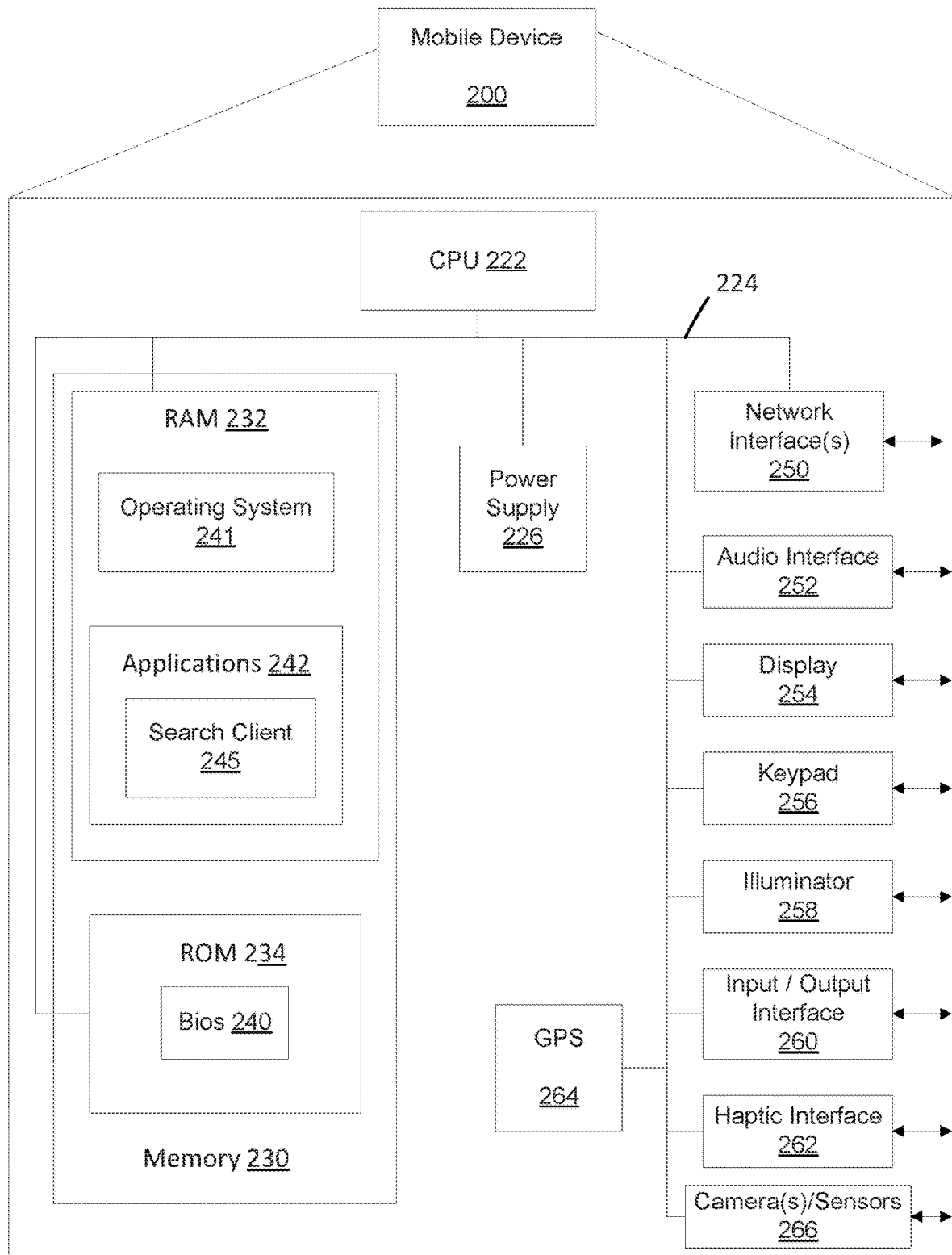
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below.

Figure 3:
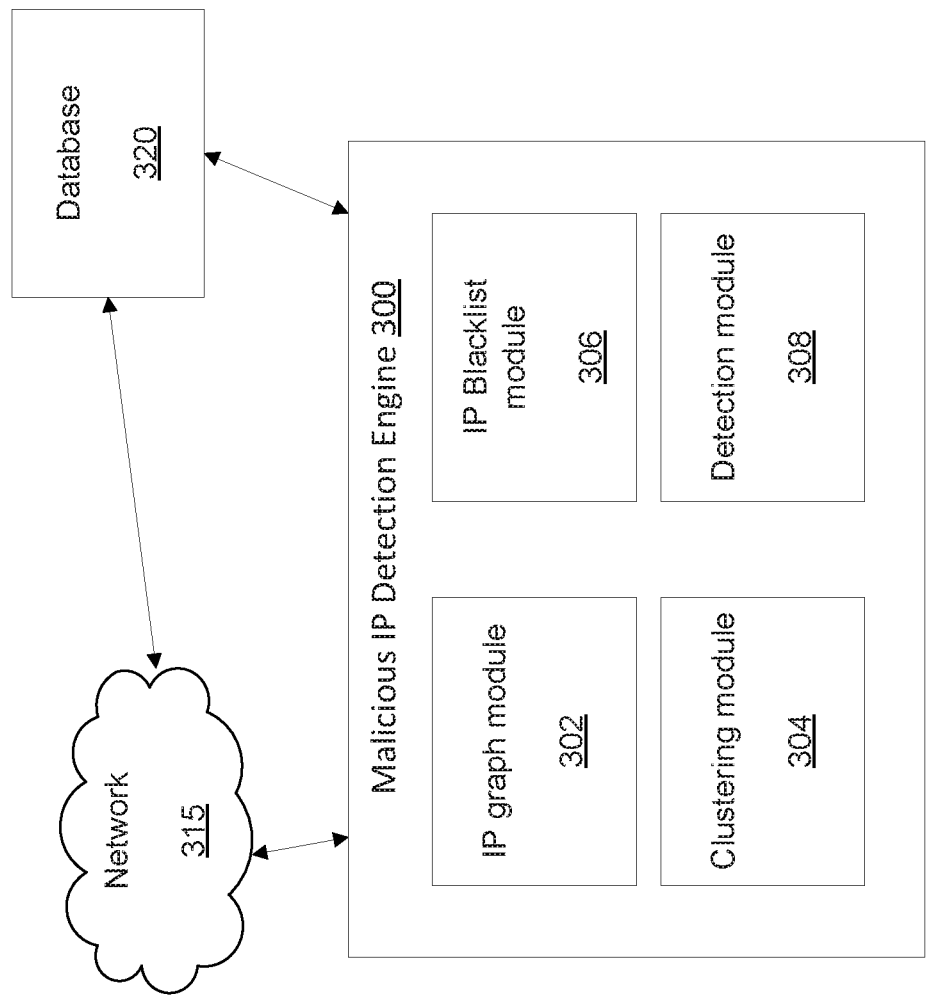
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a malicious IP detection engine 300, network 315 and database 320. The malicious IP detection engine 300 can be a special purpose machine or processor and could be hosted by an application server, content server, social networking server, web server, search server, content provider, email service provider, ad server, user's computing device, and the like, or any combination thereof.

According to some embodiments, malicious IP detection engine 300 can be embodied as a stand-alone application that executes on a user device. In some embodiments, the malicious IP detection engine 300 can function as an application installed on the user's device, and in some embodiments, such application can be a web-based application accessed by the user device over a network. In some embodiments, the malicious IP detection engine 300 can be installed as an augmenting script, program or application to another media and/or content hosting/serving application, such as, for example, Yahoo!® Search, Yahoo!® Mail, Flickr®, Tumblr®, Twitter®, Instagram®, SnapChat®, Facebook®, Amazon®, YouTube® and the like.

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 can comprise a dataset of content items (e.g., video files, multimedia files, images and the like), user data and associated user metadata. Such information can be stored in the database 320 independently and/or as a linked or associated dataset. It should be understood that the data (and metadata) in the database 320 can be any type of content, user or network information and type, whether known or to be known, without departing from the scope of the present disclosure.

Database 320 comprises a dataset of data and metadata associated with local and/or network information related to users, services, applications, user-generated content, third party provided content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or displaying content, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, upload, download, share, edit or otherwise avail users to content (e.g., Yahoo! ® Search, Yahoo! ® Mobile applications, Yahoo! ® Mail, Flickr®, Tumblr®, Twitter®, Instagram®, SnapChat®, Facebook®, Amazon®, YouTube®, and the like). In some embodiments, database 320 can comprise data and metadata associated with such content information from one and/or an assortment of media hosting sites.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index content information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology.

While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more services and/or content providers, and in some embodiments, database 320 can be configured as a linked set of data stores that provides such information, as each datastore in the set is associated with and/or unique to a specific service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the malicious IP detection engine 300, and the database of stored resources 320. Indeed, as illustrated in FIG. 3, the malicious IP detection engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as malicious IP detection engine 300, and includes IP graph module 302, clustering module 304, IP blacklist module 306, and detection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
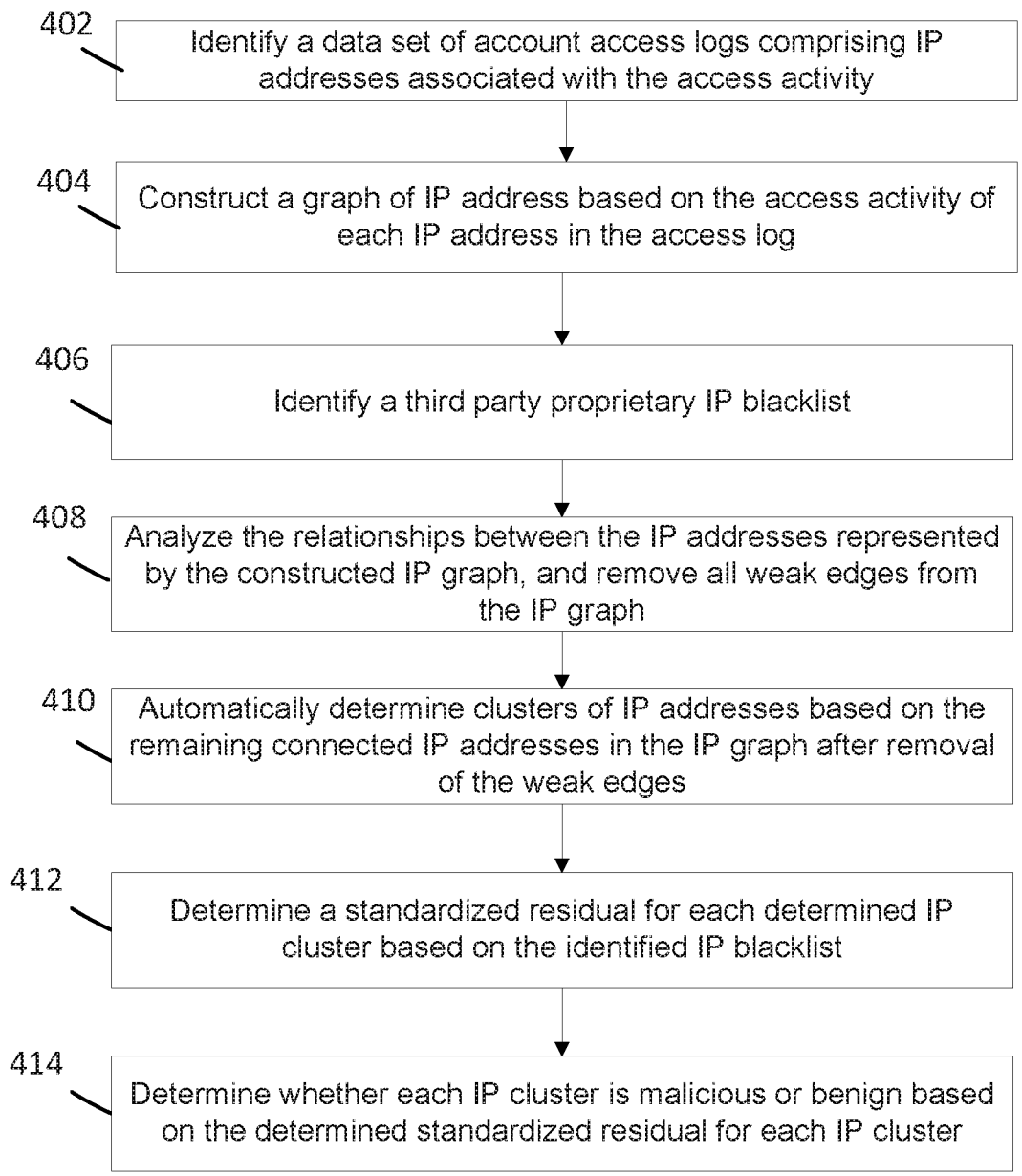
FIG. 4 is a flowchart illustrating steps performed in accordance with some embodiments of the present disclosure.

Turning to FIG. 4, Process 400 details steps performed in accordance with some embodiments of the present disclosure for a novel clustering framework applied on datasets of network interactions for automatically identifying IP clusters carrying out a specific task(s) based on an IP blacklist. The disclosed systems and methods can analyze network activity of devices associated with the IP addresses, and/or the IP addresses themselves, and perform an automatic, on-the-spot analysis that results in a determination whether the activity is permitted on or over a network. As discussed in detail below, Steps 402-404 and 408 of Process 400 are performed by the IP graph module 302 of the malicious IP detection engine 300; Step 406 is performed by the IP Blacklist module 306; Step 410 is performed by the clustering module 304; and Steps 412-414 are performed by the detection module 308.

As discussed above, complex malicious activities on the Internet are typically carried out by groups of IP addresses. For example, the scale of most malicious activities, such as spamming or denial of service attacks, can be improved by splitting the load over many hosts; alternatively, adding redundancy to various components of a malicious activity (e.g., botnet command-and-control servers) can prevent single point of failures. Perhaps more importantly, utilizing many different hosts as the attack source, malicious activity has a better chance of evading detection.

Groups of IP addresses performing or associated with malicious activity may belong to compromised hosts (e.g., botnets) or dedicated malicious servers—e.g., they are often from all around the world. Nevertheless, they often exhibit common traits specific to the group they are in since they collectively carry out a common task. Such similarities allow organizations at the receiving end of a malicious activity to cluster these IP addresses together.

With regard to the discussion of Process 400 of FIG. 4, first three non-limiting examples will be discussed in order to demonstrate example embodiments of how IP addresses associated with malicious network activity leave traces at various vantage points in the network, and therefore can be clustered together. After that, the discussion of Process 400 will begin with the detailing of some embodiments of a novel blacklist-aware clustering scheme, then how such scheme can be utilized to identify malicious IP clusters.

By way of a non-limiting example, many web services, such as online social networks and web email providers, are plagued by malicious accounts, which are often used to send spam emails, post spam comments on blogs/forums, post fake product reviews, distribute political views, and the like. These accounts may initially be legitimate accounts that are later taken over by attackers, or can be accounts specifically created by attackers for malicious purposes (e.g., Sybil accounts/attacks). Regardless of their origins, attackers often rely on a limited pool of compromised hosts to login these accounts to carry out malicious acts. This often leads to multiple compromised hosts accessing same sets of accounts within a certain time window. Therefore, the IP addresses of such compromised hosts often manifest themselves as tightly connected clusters when a web service provider performs clustering analysis on its access logs by linking together IP addresses which log in same sets of users.

In another non-limiting example, in a typical email spam campaign, spammers attempt to send vast number of email messages to vast number of recipients. To accomplish this, they often utilize several compromised hosts as Simple Mail Transfer Protocol (SMTP) servers. By originating spam from many different SMTP servers, spammers can scale up the number of mails that they send. In addition, incorporating many different sources in a spam campaign also helps spammers evade detection.

For example, a group of IP addresses serving a specific spam campaign often sends emails which tend to look similar to each other. This can be observed even for template-based spam campaigns, where each spam email is dynamically generated and slightly different than others, since spam templates often have invariant and limited-varying portions in order to generate semantically sensible content. As a result, by measuring the similarity between email content sent by different IP addresses, email service providers targeted by a spam campaign can cluster together the IP addresses utilized by the campaign.

In yet another non-limiting embodiment, substantial amount of malicious activities on the Internet, such as spam, denial of service attacks, brute force attacks, and the like, are carried out by networks of compromised hosts called botnets. To successfully accomplish these attacks, members of a botnet (i.e., bots) coordinate with each other by regularly receiving command and control messages from their botmasters. There are typically two architectures (e.g., centralized and peer-to-peer) adopted by botmasters to efficiently distribute these messages among bots. In a centralized botnet, member bots reach out to a central resource, such as a specific Internet Relay Chat (IRC) channel or an IP address or a domain name, and the like, to receive command and control messages. In a peer-to-peer botnet, on the other hand, member bots form a peer-to-peer overlay network to distribute command and control messages among themselves.

From the perspective of edge routers monitoring the traffic of a large network which unwittingly harbors many bots (e.g., an Internet Service Provider (ISP)), clustering the bots of a centralized botnet together is relatively straightforward. In some embodiments, all IP addresses communicating with a specific central resource can be put in a same cluster. This task becomes slightly more computationally difficult for peer-to-peer botnets since there is no central resource. However, it is still possible to link together the members of a peer-to-peer botnet using various statistical clustering techniques, since they heavily communicate with each other—often substantially more than they communicate with other IP addresses which do not belong to the botnet.

The above examples present various non-limiting scenarios where IP addresses, which collectively carry out a common task, can be linked together by simple data analysis methods. Although the specifics vary significantly, there is a common underlying structure in all those examples. That is, in all cases above, IP addresses can be clustered together based on a similarity metric which i) yields higher values (e.g., related to how similar they are) between IP addresses which belong to the same cluster, and ii) yields lower values between IP addresses which do not belong to the same cluster. In other words, for example, in the case of botnet command and—control example discussed above, the similarity metric between a pair of IP addresses can be defined as the number of common domain names that the two IP addresses have accessed within a specific time window— excluding popular domain names such as "google.com" or "yahoo.com" which are accessed by almost all IP addresses. Likewise, in the case of malicious web accounts, for example, the similarity metric can be the number of common accounts that the two IP addresses have been used to log in within a specific time window.

Once such an appropriate similarity metric is defined between pair of IP addresses, a given dataset can be represented as an undirected graph, where vertices represent IP addresses and the edge-weight between two vertices represents the similarity metric value between corresponding IP address. After building such a generic graph, the malicious IP detection engine 300 can employ a very simple clustering scheme that i) removes all "weak edges" from the graph, where a "weak edge" is defined as an edge whose weight is less than a threshold; and ii) outputs the connected components of the resulting graph as clusters, as discussed below.

According to some embodiments, a decision of engine 300 involves how to pick a proper threshold value which yields meaningful clusters. If too low threshold is utilized, then engine 300 would not be able to isolate malicious clusters and ends up with very large clusters possibly comprising both malicious and benign IP addresses (as with conventional systems). On the other hand, if too high threshold is utilized, then engine 300 may run into risk of fragmenting malicious clusters into smaller ones, thereby making them much harder to detect.

To address this, Process 400 executed by engine 300 utilizes an IP blacklist in order to find the optimal threshold value. According to some embodiments, the threshold value can be automatically set or selected so that the "statistical dependence" between the blacklist and the malicious clusters produced by the clustering procedure is maximized, as discussed herein. The intuition is that, the stronger the dependence between a cluster and the blacklist, the stronger the evidence that the cluster is malicious. Therefore by maximizing this statistical dependence, the clustering scheme employed by engine 300 and embodied by Process 400 is able to output malicious clusters with strongest statistical evidence of being indeed malicious. As discussed below, first how to measure this dependence is discussed, and then embodiments of a procedure to pick the optimal threshold is detailed.

According to some embodiments, in order to measure statistical dependence, as discussed above, suppose engine 300 is provided an IP blacklist 'B' and a dataset 'N' from which a cluster of IP addresses 'C' can be extracted. To measure the dependence between the blacklist 'B' and an extracted IP cluster 'C' from the dataset 'N', the following pair of events with binary outcomes for each IP address in the dataset are defined/determined:

i) $cl_i$: $i^{th}$ IP address of dataset N is in cluster C; and ii) $bl_i$: $i^{th}$ IP address of dataset N is in blacklist B.

Evident from the above, these events are independent if 'C' is benign. However, for malicious clusters these events are to be measurably dependent upon each other. To measure the (in)dependence between these events, a standardized residual can be computed, which is the difference between observed and expected number of co-occurrences of these events divided by its standard error under a null hypothesis (i.e. when the events are independent). Standardized residual essentially measures how much more frequently the IP addresses of cluster C are in blacklist B with respect to the case where C is benign. Therefore, higher standardized residual values indicate stronger evidence that the events are dependent. More specifically, standardized residual (R) is defined as:

$$R = \frac{n - \hat{\mu}}{\sqrt{\hat{\mu}(1 - p_1)(1 - p_2)}}, \qquad \text{(Eq. 1)}$$

where n is the observed number of times these events co-occur; μ is the expected number of times these events co-occur if they were independent; and $p_1$, $p_2$ are the probabilities of event 1 and event 2, respectively. According to some embodiments, for example, using a null hypothesis results in cluster C being benign, and the events $cl_i$ and $bl_i$ are independent. Therefore, the expected number of times that an IP address is both in cluster C and in blacklist B can be written as:

$$\hat{\mu} = |N| \frac{|C|}{|N|} \frac{|B|}{|N|} = \frac{|C| \cdot |B|}{|N|}, \quad (\text{Eq. 2})$$

where |N| denotes the number of IP addresses in the dataset; |B| denotes the number of blacklisted IP addresses in the dataset; and |C| denotes the size of cluster C. Since the probability of an IP address being in C is $p_1 = |C|/|N|$, and similarly, the probability of an IP address being in blacklist B is $p_2 = |B|/|N|$, the standardized residual of cluster C having n IP addresses can be computed as follows:

$$R = \frac{n - \frac{|C| \cdot |B|}{|N|}}{\sqrt{\frac{|C| \cdot |B|}{|N|}\left(1 - \frac{|C|}{|N|}\right)\left(1 - \frac{|B|}{|N|}\right)}}. \quad (\text{Eq. 3})$$

Using this measure of statistical dependence, the optimal threshold for proposed clustering scheme can be set, selected, determined or otherwise identified, as discussed below. According to some embodiments, the clustering scheme of Process 400 applied by engine 300 can be configured to produce malicious IP clusters which have as high standardized residuals as possible. This would maximize the evidence that these clusters are indeed malicious. At the same time, the clustering scheme discussed herein is also configured to avoid producing many small and fragmented clusters since distinguishing between malicious and benign clusters is much more accurate for larger clusters, as discussed in more detail below. Such configurations of the engine 300 can be achieved by maximizing the average standardized residual over all clusters. This objective function can be written as:

$$\hat{\mathcal{O}} = \frac{1}{k} \sum_{i=1}^{k} R_i, \quad (\text{Eq. 4})$$

where k is the number of clusters and $R_i$ is the standardized residual of $i^{th}$ cluster as given in Eq. 3. In some embodiments, standardized residual is expected to be zero for benign clusters, since $E[n] = \mu$ is under a null hypothesis as illustrated in Eq. 1. Therefore, benign clusters do not contribute to the objective function at all. Thus, by maximizing the average standardized residual, the clustering scheme discussed herein can be optimized over malicious clusters without explicitly identifying them first. Essentially, by maximizing, malicious clusters are forced to have as high standardized residuals as possible. At the same time, by maximizing Θ, fewer clusters are favored leading to less fragmentation due to k in the denominator.

In order to determine the optimal threshold, the following provides an example embodiment for determining the threshold parameter over a variable, optimized limited range of parameters:

```
Data: IP-IP Graph (G)
Data: List of candidate threshold values (T)
Result: t̂: Optimal Threshold
t̂ ← −∞;
Ô ← −∞;
for t ∈ T do
    |    G' ← remove edges with weight < t from G;
    |    Find connected components of G';
    |    compute Ô for connected components;
    |    if Ô > Ô then
    |    |    Ô ← Ô;
    |    |    t̂ ← t
    |    end
end
```

Once the optimal threshold for a given dataset using the above procedure is performed, the disclosed clustering scheme is applied to an identified dataset and given IP blacklist in order to obtain a list of clusters.

Turning to Process 400, the steps of Steps 402-414 are to be discussed herein, followed by example, non-limiting embodiments evidencing the applicability of applying the steps of Process 400 on network activity in order to identify malicious IP addresses and leverage such identification in order to facilitate and/or prevent certain types of activity based on the IP address attempting to perform such activity.

Process 400 begins with Step 402 where a data set of account access logs comprising IP addresses associated with access activity to a network account(s) or platform(s) are identified. As discussed above, the access logs can be associated with any type of activity performed by a device or platform on a network, and can include information that provides the types of activities performed by such devices and the IP addresses such devices used to perform them.

In Step 404, a graph of IP addresses is constructed based on the access activity of each IP address in the identified access log. According to some embodiments, the graph of IP addresses is constructed such that pairs of IP addresses are represented as being connected if they are determined to both login to at least one (1) common user account. Here, the actual number of common user accounts is recorded and stored as the edge weight, as discussed above.

For example, (from Step 402) the access logs of compromised webmail accounts (e.g., sending email spam, stealing contact lists, up-voting spam emails to fool spam filters, registering for third party websites for comment spamming, and the like) comprise a dataset of real-world login events observed at the login servers of a large webmail service with hundreds of millions of active users (e.g., Yahoo!® Mail). In Step 404, the IP address and the anonymized account ID from each login event is utilized to build the IP graph, as discussed above, where the nodes on the graph are IP addresses and there is an edge between two nodes if the corresponding IP addresses correspond to a common account login for a predetermined time period (e.g., one day).

In Step 406, an IP blacklist is identified, as discussed above. According to some embodiments, the blacklist can be a third party proprietary blacklist.

In Step 408, the relationships between the IP addresses represented in the constructed IP graph are analyzed in accordance with the edge weights of each IP address/IP address pair or connection, and as a result, the weak edges are removed from the graph. As discussed above, a weak edge is defined as an edge whose weight is smaller than a threshold. Using the determined optimal threshold value discussed above, which is determined by maximizing the average standardized residual using the IP blacklist identified in Step 406, the edges below such threshold, and the associated IP addresses of each weak edge are removed from the IP graph.

In Step 410, engine 300 automatically determines clusters of IP addresses based on the remaining connected IP addresses in the IP graph after the removal of weak edges performed in Step 408. As discussed above, after removing weak edges in Step 408, the remaining connected components in the IP graph are output as a file that identifies the remaining IP clusters and/or IP cluster pairs. According to some embodiments, a cluster of IP addresses at or below a threshold amount can be automatically ignored—e.g., removed from the determined clusters.

In Step 412, a standardized residual for each determined IP cluster is determined using the information in the IP blacklist, as discussed in detail above. This determined standardized residual for each cluster is compared against a predetermined value (e.g., 3), and for those having a standardized residual greater than such value, a determination is made that such cluster (e.g., IP addresses in such cluster) are malicious. Step 414. Should the residual for a cluster be at or below the value, then the IP addresses in the cluster are identified as benign and the device(s) acting on the network from such IP addresses is permitted (or not prevented) from performing their requested network activity.

According to some embodiments, the determination of malicious IP clusters/addresses in Steps 412-414 can be based on the detection module 308 of engine 300 applying the Louvain Method, a modularity-based agglomerative graph cluster scheme, or any other type of known or to be known clustering scheme, algorithm or technique.

By way of a non-limiting example, according to some embodiments, recall from the above discussion that, given an IP blacklist B and a dataset N, the standardized residual (R) of a cluster C in dataset N indicates the strength of evidence that C is malicious. Using R, the amount of statistical dependency between two binary events is measured, namely IP address being in cluster C and IP address being in blacklist B. Referring to Eq. 1 above, interpretation of standardized residual is straightforward. Since R is standardized (i.e. normalized by standard error), R=r, which evidences that the observed number of co-occurrences of these two events is a particular standard deviation away from its expected value under null hypothesis. Therefore, according to some embodiments, R>3 can be considered as strong evidence that the two events are correlated, since the probability of observing this simply by chance under null hypothesis is less than 0.3%. For example, as in Step 414, to decide whether a given cluster of IP addresses is malicious or not, engine 300 computes the standardized residual using Eq. 3, and determines the cluster to be malicious if standardized residual is greater than 3.

According to some embodiments, the quality of an IP blacklist—how accurate it is, as discussed above—affects the standardized residual, and therefore the detection accuracy of IP clusters/addresses. To characterize the quality of a blacklist, the true positive rate (TPR) of the blacklist is to be defined as follows:

TPR=Pr (IP address is in blacklist B|IP address is malicious), and the false positive rate (FPR) of the blacklist is defined as follows:

FPR=Pr (IP address is in blacklist B|IP address is benign).

If cluster C is benign then blacklisted IP addresses in cluster C are due to false positives and the expected value of the standardized residual is E[R]=0, regardless of TPR and FPR values. More specifically, if cluster C is benign, then:

$$E[n]=\hat{\mu}=|C|\times FPR, \quad (Eq. 5)$$

and, equivalently: $E[n-\hat{\mu}]=0$

However, if cluster C is malicious, then the expected number of blacklisted IP addresses in cluster C is as follows:

$$E[n]=|C|\times TPR. \quad (Eq. 6)$$

Since there are far more benign IP addresses than malicious ones in a dataset, the probability of an IP address in dataset N being in blacklist B can be equal to the blacklist's false positive rate (e.g., $p_2$=FPR). As a result, combining this with Eq. 3, the expected value of a standardized residual can be, according to some embodiments:

$$E[R] = \frac{|C|(TPR - FPR)}{\sqrt{(|C|\cdot FPR)\left(1 - \frac{|C|}{|N|}\right)(1 - FPR)}}. \quad (Eq. 7)$$

In some embodiments, when the cluster is malicious, the expected standardized residual increases as the difference between the blacklist's TPR and FPR increases. The expected standardized residual rate also increases with the cluster size as well. This leads to the following understandings: i) malicious clusters can be identified more accurately when utilizing a more accurate IP blacklist; and ii) larger clusters can be identified more accurately than smaller ones.

Figure 5:
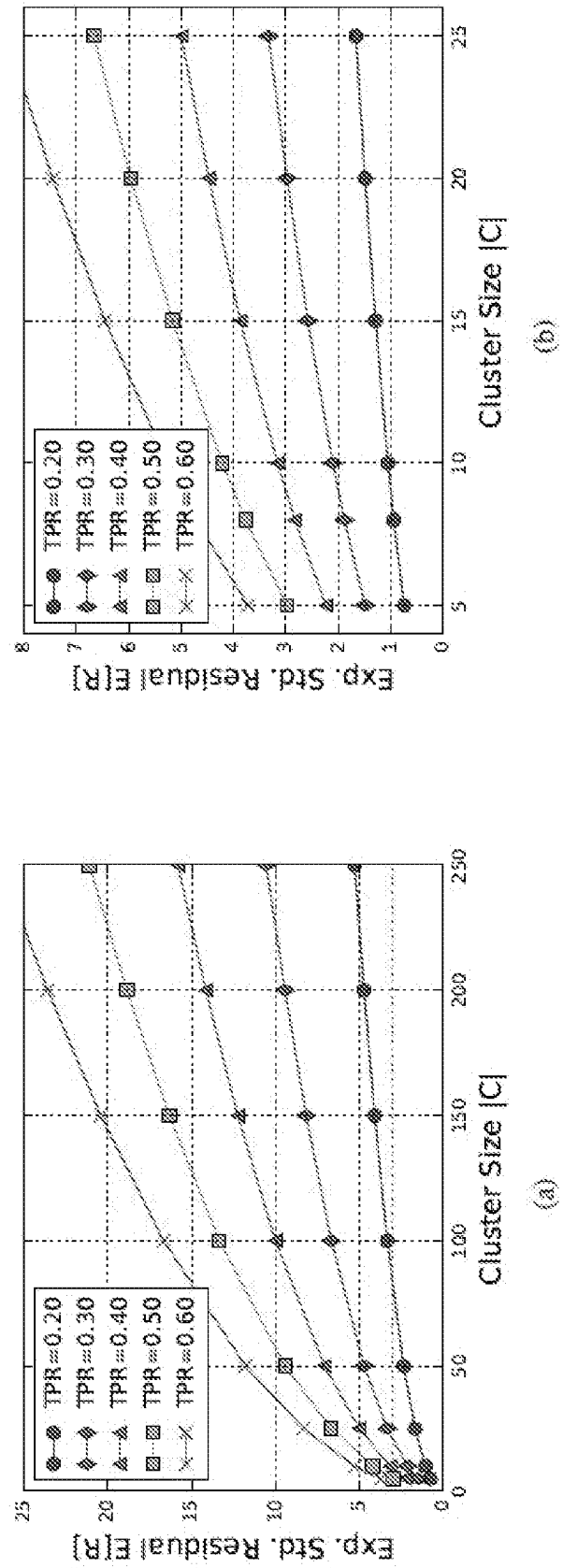
FIG. 5 illustrates non-limiting example embodiments of expected standardized residuals for difference cluster sizes and true positive rates in accordance with some embodiments of the present disclosure.

However, according to some embodiments, it turns out the blacklist does not have to be very accurate (e.g., satisfy an accuracy threshold or be within a determined range of the accuracy threshold) in order to accurately identify malicious clusters. For example, setting a blacklist FPR=10%, and the size of the whole dataset to |N|=100,000. As illustrated in FIG. 5, the expected standardized residual quickly exceeds the critical value 3 even when blacklist true positive rate is 40%. Therefore, for example, a "mediocre" blacklist with 10% false positive rate and 40% true positive rate can be used to accurately identify most malicious clusters with size greater than 9. Furthermore, even a "poor" performing (or quality) blacklist with TPR=20% and FPR=10% can be used to accurately identify malicious clusters as long as their size is greater than 80.

The above discussion is evidenced in FIG. 5, which illustrates non-limiting example embodiments of expected standardized residuals for difference cluster sizes and true positive rates, where the lower part of (a) is magnified in (b).

Figure 6:
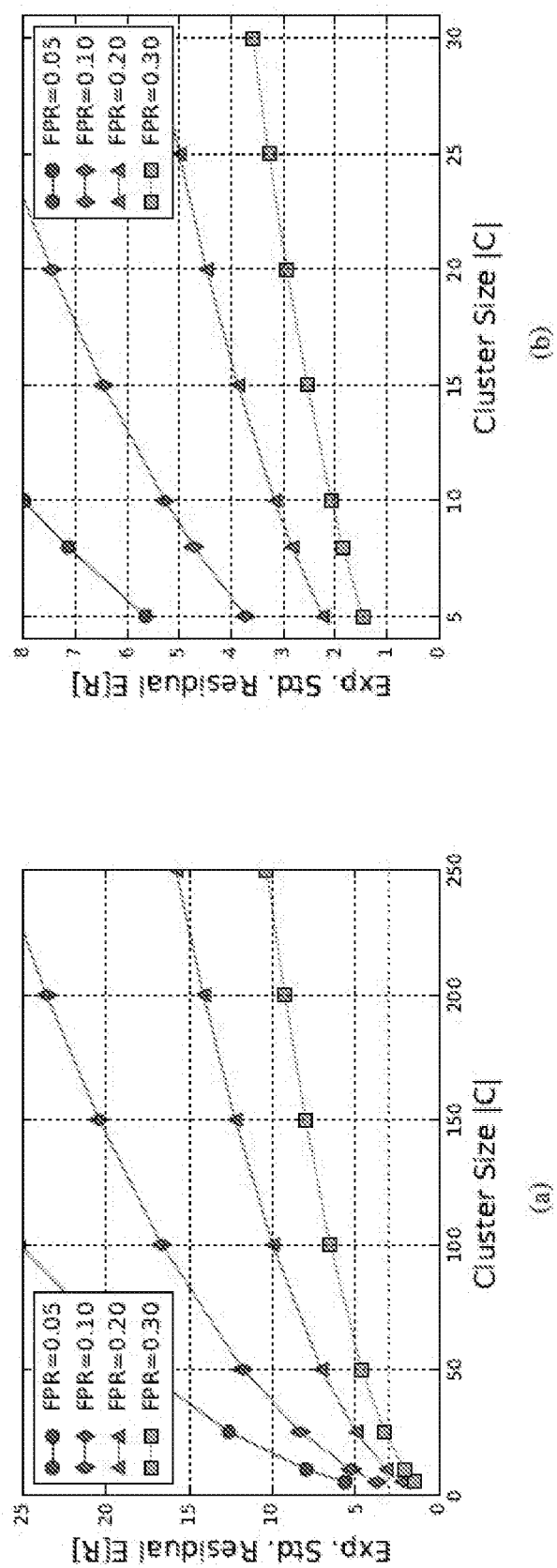
FIG. 6 illustrates non-limiting example embodiments of expected standardized residuals for difference cluster sizes and false positive rates in accordance with some embodiments of the present disclosure.

On the other hand, according to some embodiments, FIG. 6 illustrates non-limiting example embodiments of expected standardized residuals for difference cluster sizes and false positive rates. In such example, a blacklist true positive rate is set to TPR=60% and the plotted expected standardized residual for different false positive rates and cluster sizes is illustrated in (a) and (b) of FIG. 6. For example, for low false positive rates, such as FPR=10%, the blacklist can be used to accurately identify malicious clusters with size as small as 5. For larger false positive rates, such as FPR=30%, malicious cluster size has to be greater than 20 in order to be reliably identified using the blacklist.

Thus, in accordance with the above discussion and illustrated examples of FIGS. 5-6, the probability of the standardized residual being greater than 3 can be written as, using Eq. 1 above:

$$Pr[R>3]=Pr[n>\hat{\mu}+3\cdot\sqrt{\hat{\mu}(1-p_1)(1-p_2)}], \quad (Eq. 8)$$

which, after combining with Eq. 7, is equivalent to:

$$Pr\left[n > |C| \cdot FPR + 3 \cdot \sqrt{(|C| \cdot FPR)\left(1 - \frac{|C|}{|N|}\right)(1 - FPR)}\right]. \quad \text{(Eq. 9)}$$

This probability can be computed since n is the number of blacklisted IP addresses in cluster C and binomially distributed, such that:

$$Pr(n) = \binom{|C|}{n}(TPR)^n(1 - TPR)^{|C|-n}. \quad \text{(Eq. 10)}$$

Figure 7:
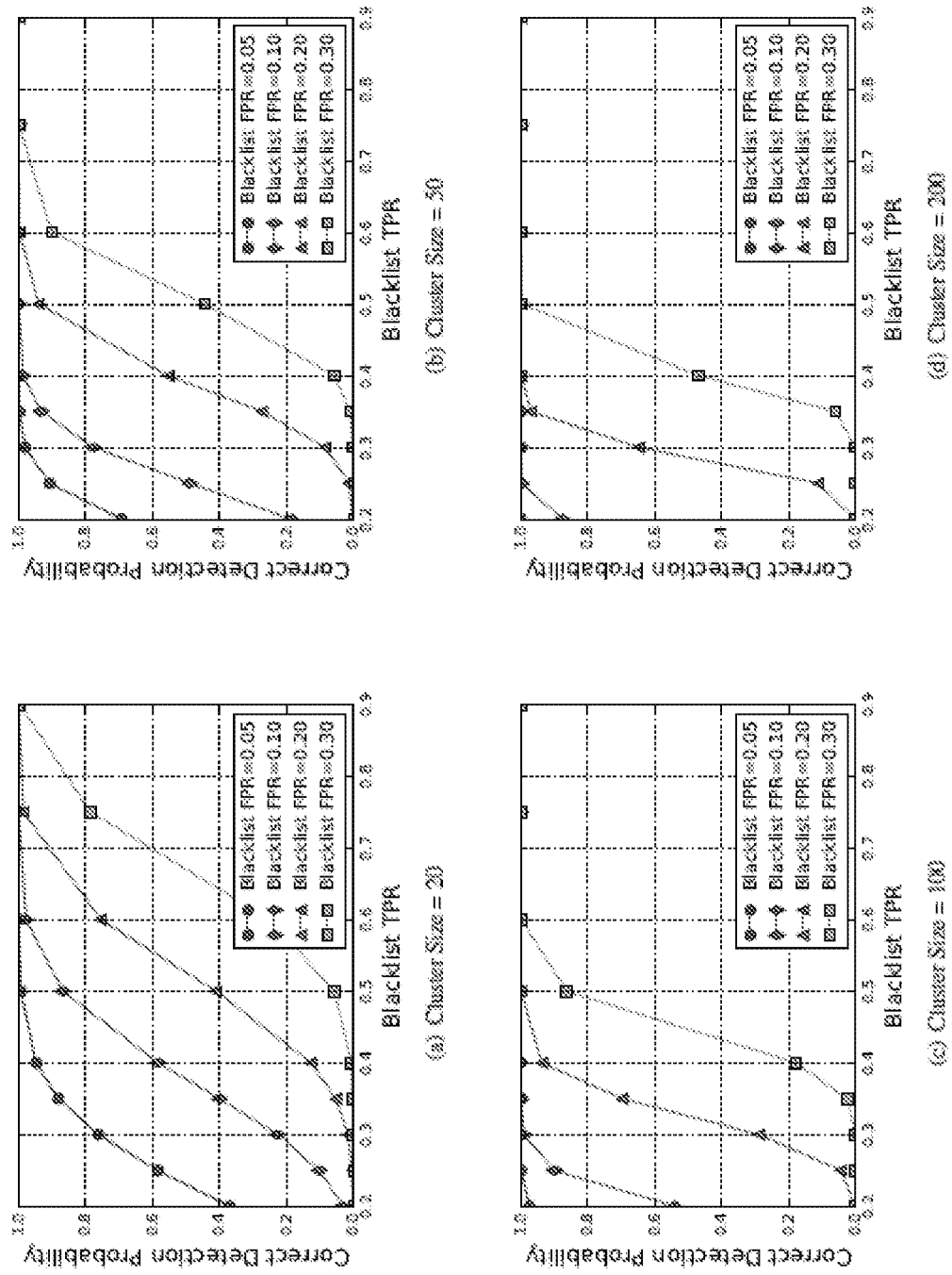
FIG. 7 illustrates non-limiting example embodiments of detected malicious clustering probabilities in accordance with some embodiments of the present disclosure.

Using these above equations, probability can be plotted for correctly detected malicious clusters (e.g., Pr[R>3]) for various blacklist true and false positive rates, and different cluster sizes, as illustrated in the example embodiments of FIG. 7 where N=100,000 IPs in an entire dataset. FIG. 7 illustrates that higher quality blacklists yield more accurate results, and detection accuracy improves rapidly in accordance with increasing cluster size. For example, a "mediocre" blacklist with TPR=50% and FPR=10% is able to identify a malicious cluster of size 20 around 85% of the time. The same blacklist correctly identifies almost all (e.g., ~94-99%) of the malicious clusters when the cluster size grows to 50, and continues to increase in accuracy as the cluster grows to 100 and 200 (as illustrated in (a)-(d) in FIG. 7). As discussed above, according to a non-limiting example, with standardized residual threshold set to 3, the probability of falsely claiming a benign cluster to be malicious is less than 0.3% in all cases. Thus, Process 400 discussed above can accurately detect malicious clusters using even low-quality (e.g., "mediocre" or below a threshold value) blacklist.

Having discussed how engine 300 compiles the clustering scheme and its application in determining malicious IP addresses and/or clusters, the disclosure now turns to disclosing non-limiting examples of how identifying groups of malicious IP addresses can potentially improve the performance of overall defense mechanisms in various important ways.

By way of one non-limiting example, one way to improve defenses is to block IP addresses in identified malicious clusters next time they come around, thereby turning malicious IP clusters into essentially an extended blacklist.

In another non-limiting example, the information about malicious clusters can be utilized to generate labeled malicious detection data—e.g., data associated with the IP addresses identified as malicious (e.g., for a predetermined period of time) that satisfies an accuracy threshold (referred to as "ground truth data"), which can later be used to train and test various machine learning classifiers. In fact, being able to generate reliable ground truth data is useful since ground truth data is notoriously hard to come by in security applications. Thus, in some embodiments, after identifying malicious IP clusters, engine 300 can generate a labeled dataset of IP addresses where IP addresses in malicious clusters have positive labels. While there may be situations where some of the labels may be incorrect, due to the same reasons that yield high false positive rates as discussed above, many off-the-shelf machine learning classifiers can tolerate label noise to some extent. Therefore, this labeled dataset can be used to train a classifier to make decisions regarding the nature of an IP address' associated activity in virtually any context. In some embodiments, in order to properly train a machine learning classifier, labels may need to be randomly sampled from the underlying distribution that governs the IP address population ensuring that the classifier does not solely focus only on certain pockets of the IP address space.

By way of another non-limiting example, machine learning classifiers which make "good or bad" decisions on IP addresses and/or clusters can leverage the labeled data determined by engine 300 in order to more accurately identify which IP addresses/clusters are "good or bad" (or malicious or benign). For example, a system which decides whether an incoming login attempt is suspicious or not, and provides additional authentication challenges to suspicious attempts, can additionally employ features associated with the labeled IP addresses/clusters from engine 300's results. Such features can include, but are not limited to, information indicating that the IP addresses/clusters are "is in a malicious cluster" or "fraction of blacklisted IP addresses in the cluster that IP address belongs to", and the like. Since the IP cluster features can convey significant information about maliciousness of IP addresses in the cluster, such features would boost the overall classification accuracy.

In yet another non-limiting example, in intrusion detection systems, numbers of false positives pose significant challenges when a subsequent complex action, such as manual verification or account cancellation, is required upon identifying a malicious data point. The challenge becomes particularly more prominent under high volumes of data, which causes detection systems—even with very low false positive rates—to inevitably generate unmanageably high number of false positives. Under such conditions, it may be crucial to prioritize the detected incidents, so that the true positives are acted on as early as possible before wasting too much time or computational energy/power on false positives. To achieve such a prioritization, the disclosed systems and methods can utilize the information about malicious IP clusters by assigning a higher priority to detected incidents that are associated with malicious IP clusters (e.g., when a source IP address is in a malicious cluster). Since true positives are malicious in nature and therefore more likely to be associated with malicious IP clusters, such prioritization schemes could apply a high(er) priority to true positives.

Figure 8:
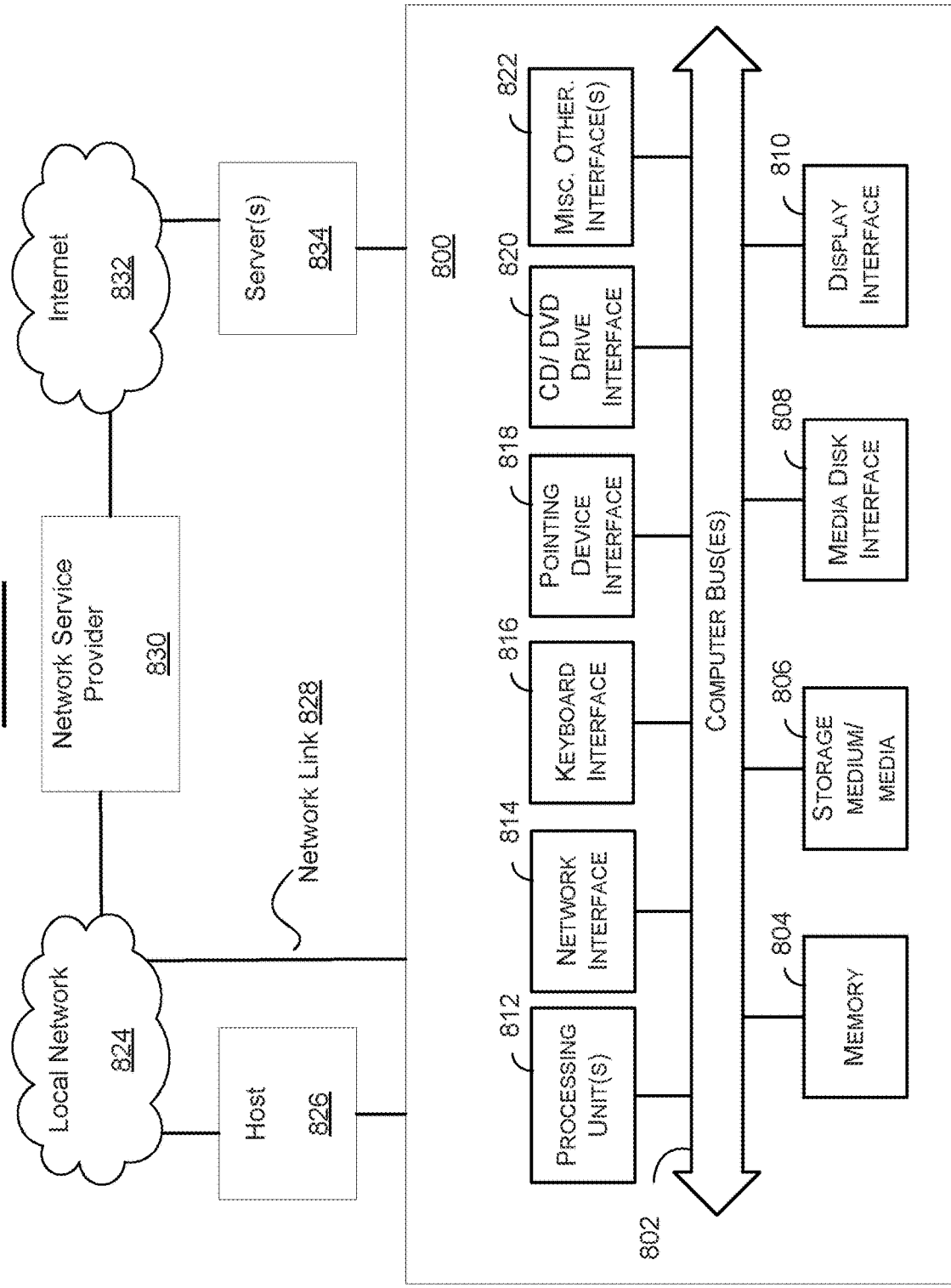
FIG. 8 is a block diagram illustrating the architecture of an exemplary hardware device in accordance with one or more embodiments of the present disclosure.

As shown in FIG. 8, internal architecture 800 of a computing device(s), computing system, computing platform and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk interface 808 and/or media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing image and/or video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
identifying, via a server on a network, an access log comprising a first set of IP addresses and a type of network activity performed by each IP address in said first set, said access log indicating a relationship between each IP address and each type of activity performed;
clustering, via the server, each first IP address based on said relationship;
identifying, via the server, an Internet Protocol (IP) blacklist comprising a second set of IP addresses associated with malicious activity on said network;
analyzing, via the server, the IP blacklist, and determining, based on said analysis, a set of parameters defining relationships between each second IP address and the malicious activity;
analyzing, via the server, each first IP cluster based on said set of parameters, and, based on said analysis, identifying a set of IP clusters that are performing the malicious activity;
modifying, via the server, the access log by extracting said identified IP clusters from said access log;
receiving, via the server, a request from a first device to perform a task on said network; and
determining, via the server, whether said task is capable of being performed based on an IP address associated with said request, wherein if the IP address is on said modified access log, said task is permitted.

2. The method of claim 1, further comprising:
preventing said task from being performed when said IP address is determined not to be on said modified access log.

3. The method of claim 2, further comprising:
updating said modified IP blacklist based on said preventions of the task.

4. The method of claim 1, further comprising:
identifying each pair of second IP addresses sharing a relationship; and
generating a file that includes information indicating each identified pair of second IP addresses.

5. The method of claim 4, further comprising:
determining a co-occurrence value of each second IP address in said file based on said pairing; and
determining, based on said co-occurrence value, a standardized residual value for each IP address in the access log that appears in said IP blacklist.

6. The method of claim 5, further comprising:
comparing said standardized residual value for said IP address against a predetermined threshold value; and
determining that said IP address is malicious when said standardized residual value is above said threshold value, wherein said extraction is based on said determination.

7. The method of claim 1, wherein said type of relationship between each IP address and each type of activity performed indicates whether the IP address is a source of the network activity, a proxy for the network or a gateway of the network activity.

8. The method of claim 1, wherein said second set of IP addresses included in said IP blacklist are associated with compromised network accounts.

9. The method of claim 1, wherein said second set of IP addresses included in said IP blacklist are associated with dedicated malicious servers.

10. The method of claim 1, wherein said second set of IP addresses included in said IP blacklist are associated with compromised hosts (botnets).

11. The method of claim 1, wherein said network activity is associated with login events, wherein each IP address in said set is associated with a device performing a login event.

12. The method of claim 1, wherein said IP blacklist is provided by a third party.

13. A non-transitory computer-readable storage medium tangibly encoded with computer-executable instructions, such that when a server executes the instructions, a method is performed comprising:
identifying, via the server on a network, an access log comprising a first set of IP addresses and a type of network activity performed by each IP address in said first set, said access log indicating a relationship between each IP address and each type of activity performed;
clustering, via the server, each first IP address based on said relationship;
identifying, via the server, an Internet Protocol (IP) blacklist comprising a second set of IP addresses associated with malicious activity on said network;
analyzing, via the server, the IP blacklist, and determining, based on said analysis, a set of parameters defining relationships between each second IP address and the malicious activity;
analyzing, via the server, each first IP cluster based on said set of parameters, and, based on said analysis, identifying a set of IP clusters that are performing the malicious activity;
modifying, via the server, the access log by extracting said identified IP clusters from said access log;
receiving, via the server, a request from a first device to perform a task on said network; and
determining, via the server, whether said task is capable of being performed based on an IP address associated with said request, wherein if the IP address is on said modified access log, said task is permitted.

14. The non-transitory computer-readable storage medium of claim 13, further comprising:
preventing said task from being performed when said IP address is determined not to be on said modified access log.

15. The non-transitory computer-readable storage medium of claim 14, further comprising:
updating said modified IP blacklist based on said preventions of the task.

16. The non-transitory computer-readable storage medium of claim 13, further comprising:
identifying each pair of second IP addresses sharing a relationship; and
generating a file that includes information indicating each identified pair of second IP addresses.

17. The non-transitory computer-readable storage medium of claim 16, further comprising:
determining a co-occurrence value of each second IP address in said file based on said pairing;
determining, based on said co-occurrence value, a standardized residual value for each IP address in the access log that appears in said IP blacklist;
comparing said standardized residual value for said IP address against a predetermined threshold value; and
determining that said IP address is malicious when said standardized residual value is above said threshold value, wherein said extraction is based on said determination.

18. The non-transitory computer-readable storage medium of claim 1, wherein said type of relationship between each IP address and each type of activity performed indicates whether the IP address is a source of the network activity, a proxy for the network or a gateway of the network activity.

19. The non-transitory computer-readable storage medium of claim 1, wherein said second set of IP addresses included in said IP blacklist are associated with at least one of a compromised network account, a dedicated malicious server, and a compromised host (botnet).

20. A server comprising:
a processor; and
a non-transitory computer-readable storage medium for tangibly storing thereon program logic for execution by the processor, the program logic comprising:
   logic executed by the processor for identifying, via the server on a network, an access log comprising a first set of IP addresses and a type of network activity performed by each IP address in said first set, said access log indicating a relationship between each IP address and each type of activity performed;
   logic executed by the processor for clustering, via the server, each first IP address based on said relationship;
   logic executed by the processor for identifying, via the server, an Internet Protocol (IP) blacklist comprising a second set of IP addresses associated with malicious activity on said network;
   logic executed by the processor for analyzing, via the server, the IP blacklist, and determining, based on said analysis, a set of parameters defining relationships between each second IP address and the malicious activity;
   logic executed by the processor for analyzing, via the server, each first IP cluster based on said set of parameters, and, based on said analysis, identifying a set of IP clusters that are performing the malicious activity;
   logic executed by the processor for modifying, via the server, the access log by extracting said identified IP clusters from said access log;
   logic executed by the processor for receiving, via the server, a request from a first device to perform a task on said network; and
   logic executed by the processor for determining, via the server, whether said task is capable of being performed based on an IP address associated with said request, wherein if the IP address is on said modified access log, said task is permitted.

* * * * *